(12) United States Patent
Jana et al.

(10) Patent No.: US 9,049,225 B2
(45) Date of Patent: Jun. 2, 2015

(54) METHOD AND SYSTEM FOR DETECTING UNAUTHORIZED WIRELESS ACCESS POINTS USING CLOCK SKEWS

(75) Inventors: Suman Jana, Austin, TX (US); Sneha Kasera, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 335 days.

(21) Appl. No.: 13/063,687

(22) PCT Filed: Sep. 11, 2009

(86) PCT No.: PCT/US2009/056743
§ 371 (c)(1),
(2), (4) Date: May 26, 2011

(87) PCT Pub. No.: WO2010/030950
PCT Pub. Date: Mar. 18, 2010

(65) Prior Publication Data
US 2011/0222421 A1 Sep. 15, 2011

Related U.S. Application Data

(60) Provisional application No. 61/096,629, filed on Sep. 12, 2008.

(51) Int. Cl.
*H04L 12/28* (2006.01)
*H04L 29/06* (2006.01)
*H04W 12/12* (2009.01)

(52) U.S. Cl.
CPC .......... *H04L 63/1441* (2013.01); *H04W 12/12* (2013.01)

(58) Field of Classification Search
CPC .................................................. H04W 12/12
USPC ......... 370/252, 516; 463/25; 709/248; 726/3; 713/509
See application file for complete search history.

(56) References Cited

U.S. PATENT DOCUMENTS 5,604,806 A 2/1997 Hassan
6,301,324 B1 10/2001 Pearson
(Continued)

FOREIGN PATENT DOCUMENTS

WO WO2009033001 3/2009
WO WO2010030956 3/2010

OTHER PUBLICATIONS

Tadayoshi Kohno et al., Remote Physical Device Fingerprinting, IEEE, Apr. 2005, pp. 93-108.
(Continued)

*Primary Examiner* — Wei Zhao
*Assistant Examiner* — Lionel Preval
(74) *Attorney, Agent, or Firm* — Workman Nydegger

(57) ABSTRACT

Identifying valid wireless access points based on clock skews. A computing device receives plurality of frames, each including a corresponding timestamp, from a wireless access point. The computing device calculates transmit and receive offsets based on transmit and receive times of the plurality of frames, and also calculates differences between the transmit and receive offsets. The computing device also calculates a clock skew of a clock at the wireless access point based on a slope of the differences. The client computing device determines whether the wireless access point is an authorized wireless access point or an unauthorized wireless access point based on comparing the calculated clock skew with one or more known baseline clock skews of one or more authorized wireless access points.

20 Claims, 8 Drawing Sheets

(56) References Cited

U.S. PATENT DOCUMENTS

| | | |
|---|---|---|
| 6,442,392 B2 | 8/2002 | Ruutu |
| 6,553,120 B1 | 4/2003 | Vaudenay |
| 6,744,253 B2 | 6/2004 | Stolarczyk |
| 7,064,660 B2 | 6/2006 | Perkins |
| 7,075,424 B1 | 7/2006 | Sundaresan |
| 7,317,419 B2 | 1/2008 | Sugar |
| 7,570,063 B2 | 8/2009 | Van Veen |
| 7,856,656 B1* | 12/2010 | Kharvandikar et al. .......... 726/3 |
| 7,890,060 B2 | 2/2011 | Lehtinen |
| 8,138,918 B2 | 3/2012 | Habib |
| 8,280,046 B2 | 10/2012 | Rudolf |
| 8,502,728 B2 | 8/2013 | Joshi |
| 8,503,673 B2 | 8/2013 | Patwari |
| 8,515,061 B2 | 8/2013 | Patwari |
| 2002/0089450 A1 | 7/2002 | Dowdle |
| 2003/0048223 A1 | 3/2003 | Kezys |
| 2003/0064733 A1 | 4/2003 | Okanoue |
| 2003/0117985 A1 | 6/2003 | Fujii et al. |
| 2003/0214410 A1 | 11/2003 | Johnson |
| 2004/0170280 A1 | 9/2004 | Fekri |
| 2004/0190718 A1 | 9/2004 | Dacosta |
| 2005/0228902 A1* | 10/2005 | Lienhart et al. ............... 709/248 |
| 2005/0258988 A1 | 11/2005 | Jiang |
| 2006/0164298 A1 | 7/2006 | Azuma |
| 2006/0193284 A1 | 8/2006 | Stieglitz et al. |
| 2007/0026935 A1* | 2/2007 | Wolf et al. ...................... 463/25 |
| 2007/0035437 A1 | 2/2007 | Steinway |
| 2007/0036353 A1 | 2/2007 | Reznik |
| 2007/0060098 A1 | 3/2007 | McCoy |
| 2007/0086489 A1* | 4/2007 | Carlson et al. ................ 370/516 |
| 2007/0165845 A1 | 7/2007 | Ye |
| 2007/0177729 A1 | 8/2007 | Reznik |
| 2008/0090572 A1 | 4/2008 | Cha |
| 2008/0123851 A1 | 5/2008 | Guccione |
| 2008/0169961 A1 | 7/2008 | Steinway |
| 2008/0244094 A1* | 10/2008 | Rich et al. ..................... 709/248 |
| 2009/0052663 A1 | 2/2009 | Hammond |
| 2009/0141900 A1 | 6/2009 | Ye |
| 2009/0161127 A1 | 6/2009 | Schweid |
| 2009/0319819 A1* | 12/2009 | Haba ............................. 713/503 |
| 2010/0067701 A1 | 3/2010 | Patwari |
| 2010/0207732 A1 | 8/2010 | Patwari |
| 2010/0309051 A1 | 12/2010 | Moshfeghi |
| 2011/0273321 A1 | 11/2011 | Joshi |
| 2011/0280397 A1 | 11/2011 | Patwar |
| 2012/0004889 A1 | 1/2012 | Spiesberger |
| 2012/0009882 A1 | 1/2012 | Patwari |
| 2012/0300864 A1 | 11/2012 | Merlin et al. |
| 2013/0003077 A1 | 1/2013 | Suehira |
| 2013/0011858 A1 | 1/2013 | O'Connor et al. |

OTHER PUBLICATIONS

Liran Ma et al., A Hybrid Rogue Access Point Protection Framework . . . , IEEE, Apr. 2008, pp. 1894-1902.
International Search Report for PCT/US2009/056743, mailed Apr. 26, 2010.
Written Opinion for PCT/US2009/056743, mailed Apr. 26, 2010.
International Search Report for PCT/US2009/056718, mailed Aug. 26, 2010.
Written Opinion of the International Searching Authority for PCT/US2009/056718, mailed Aug. 26, 2010.
Zang Li, Wenyuan Xu, Rob miller, Wade Trappe, Securing Wireless Systems via Lower Layer Enforcements, Sep. 29, 2006, pp. 33-41.
Mathur, et al. "Radio-telepathy: Extracting a Secret Key from an Unauthenticated Wireless Channel" MboiCom, Sep. 14, 2008 ACM, pp. 128-139.
International Search Report for PCT/US2009/056751, mailed Apr. 15, 2010.
Written Opinion for PCT/US2009/056751, mailed Apr. 15, 2010.
International Search Report for PCT/US2008/075369, mailed Apr. 8, 2009.
Written Opinion for PCT/US2008/075369, mailed Apr. 8, 2009.
U.S. Appl. No. 12/558,106, filed Jan. 23, 2012, Office Action.
U.S. Appl. No. 12/558,106, filed Dec. 12, 2012, Notice of Allowance.
U.S. Appl. No. 13/063,659, filed Dec. 3, 2012, Office Action.
U.S. Appl. No. 12/558,106, filed Mar. 4, 2013, Notice of Allowance.
U.S. Appl. No. 13/063,646, filed Feb. 22, 2013, Notice of Allowance.
U.S. Appl. No. 13/178,295, filed Mar. 20, 2013, Office Action.
U.S. Appl. No. 13/063,646, filed Apr. 5, 2013, Notice of Allowance.
U.S. Appl. No. 13/063,659, filed Apr. 22, 2013, Notice of Allowance.
U.S. Appl. No. 12/558,106, filed Apr. 15, 2013, Notice of Allowance.
U.S. Appl. No. 12/676,492, filed Aug. 8, 2013, Office Action.
U.S. Appl. No. 13/178,295, filed Oct. 7, 2013, Final Office Action.
U.S. Appl. No. 12/676,492, filed Jun. 16, 2014, Final Office Action.
U.S. Appl. No. 13/178,295, filed May 7, 2014, Notice of Allowance.
International Preliminary Report on Patentability for PCT/US2008/075369 dated Jun. 24, 2010.
U.S. Appl. No. 13/063,646 Jun. 17, 2013, Notice of Allowance.
U.S. Appl. No. 12/676,492, Dec. 4, 2014, Notice of Allowance.

* cited by examiner

| Timestamp | Beacon Interval | Capability Info |
|---|---|---|

Algorithm 1 Separate clock offset-set points based on originating AP
─────────────────────────────────────────────
$accumulator[0].dataset \Leftarrow [(x_1, y_1)]$
$accumulator[0].current\_point \Leftarrow (x_1, y_1)$
$accumulator[0].count \Leftarrow 1$
for $i = 2$ to $n$ do
   for each entry $j$ in accumulator do
      $(tempx_k, tempy_k) \Leftarrow accumulator[k].current\_point$
      if $\Delta_{ik} \leq threshold$ then
         add $(x_i, y_i)$ to data set of accumulator entry $j$
         $accumulator[j].count \Leftarrow accumulator[j].count + 1$
         $accumulator[j].current\_point \Leftarrow (x_i, y_i)$
      end if
   end for
   if none of the entry in accumulator satisfies ($\Delta_{ik} \leq threshold$) then
      add a new accumulator entry $p$
      $p.dataset \Leftarrow [(x_i, y_i)]$
      $p.count \Leftarrow 1$
      $p.current\_point \Leftarrow (x_i, y_i)$
   end if
end for
output number of entries in accumulator as number of different data sets
output the data sets of accumulator entries as different data sets from the APs
─────────────────────────────────────────────

FIG. 3

Algorithm 2 Calculate *threshold* from test clock offset-set $finalthreshold \Leftarrow 0$
for each test data set do
   $threshold \Leftarrow \Delta_{12}$
   for $i=3$ to $n$ do
      if $\Delta_{i(i-1)} \geq threshold$ then
         $threshold \Leftarrow \Delta_{i(i-1)}$
      end if
   end for
   if $threshold \geq finalthreshold$ then
      $finalthreshold \Leftarrow threshold$
   end if
end for
output $finalthreshold$ as final calculated *threshold*

FIG. 4

METHOD AND SYSTEM FOR DETECTING UNAUTHORIZED WIRELESS ACCESS POINTS USING CLOCK SKEWS

NOTICE OF FEDERAL FUNDING

This invention was made with government support under W911NF-07-1-0318 awarded by Office of Naval Research. The Government has certain rights to this invention.

CROSS REFERENCE(S)

This present application is filed under and pursuant to 35 U.S.C. §371 and claims the priority and benefit of PCT/US2009/056743 filed Sep. 12, 2009, which in turn claims priority to and the benefit of U.S. Provisional Application No. 61/096,629, entitled "Method and System for Detecting Unauthorized Wireless Access Points Using Clock Skews," filed on Sep. 12, 2008, each being herein incorporated by reference in its entirety for all purposes.

BACKGROUND OF THE INVENTION

1. Field of Invention

The present invention relates to the field of wireless networks. Specifically, the present invention relates to using clock skew of a wireless local area network access point (AP) as its fingerprint to detect unauthorized APs quickly and accurately.

2. The Relevant Technology

With advances in micro-technology and wireless networks, networked mobile systems are becoming increasingly prevalent. There is also an ever growing demand for ubiquitous services. These two factors are fueling a wide scale deployment of wireless networks including the IEEE 802.11 wireless local area networks.

However, because of their importance in providing ubiquitous services and their inherent vulnerability due to broadcast nature of the wireless medium, the wireless local area networks (WLANs) are also becoming targets of a variety of attacks. One of the ways in which a WLAN can be attacked is by introducing one or more unauthorized (e.g., fake) Access Points (APs) in the network.

A fake AP can be set up by a malicious attacker to masquerade as an authorized AP by spoofing the authorized AP's medium access control (MAC) address, as shown in FIG. 1. This fake AP is used to fool a wireless node in the WLAN into accessing the network through the fake AP instead of the authorized one. The fake AP can then launch a variety of attacks thereby compromising the security of the wireless communication.

Setting up fake APs is not hard. Public domain programs sniff 802.11 probe request frames to find out the default AP of the probing wireless node and then impersonate the default AP. As current wireless standards do not mandate integrity protection of beacon frames and current AP selection procedures only consider signal strength as the criteria for selecting an AP, fake AP is a serious problem.

The new wireless security enhancement 802.11i RSNA (Robust Security Network Association) uses traditional cryptographic methods (i.e., digital certificates) to provide strong mutual authentication between wireless clients and the APs. Although this solution, if implemented properly, will make the fake AP attack less likely, the following practical issues can still make wireless networks using 802.11i RSNA vulnerable.

First, the traditional crypto methods are based on keys and passwords that can be stolen. Furthermore, they also commonly use public key certificates that are cumbersome and difficult to manage. That is, management and verification of digital certificates across different domains is known to be cumbersome. Second, as the current AP selection algorithms use signal strength as the only criteria for AP selection, users can be fooled to connect to the fake AP that has a higher signal strength compared to the original one but does not support any security measures such as RSNA. Third, an attacker can also set up fake APs having the same identifiers (MAC address, basic service set identifier (BSSID) and service set identifier (SSID)) as the original AP and evade detection by using different physical channel characteristics (e.g., by using short/long preambles, operating in a different channel, etc.).

Therefore, detecting unauthorized APs is a very important task of WLAN intrusion detection systems (WIDS).

SUMMARY OF THE INVENTION

What is described in the present invention is a method for determining a clock skew of a wireless local area network access point (AP). The clock skew is used as its fingerprint to detect unauthorized APs quickly and accurately. The main goal behind using clock skews is to overcome one of the major limitations of existing solutions—the inability to effectively detect Medium Access Control (MAC) address spoofing. The clock skew of an AP is calculated from the IEEE 802.11 Time Synchronization Function (TSF) timestamps sent out in the beacon/probe response frames. Two different methods for calculating clock skews are described—one based on linear programming and the other based on least square fit.

In embodiments of the present invention, a clock skew of a wireless local area network access point (AP) is used as its fingerprint to detect unauthorized APs quickly and accurately. The main goal behind using clock skews is to overcome one of the major limitations of existing solutions—the inability to effectively detect Medium Access Control (MAC) address spoofing. The clock skew of an AP is calculated from the IEEE 802.11 Time Synchronization Function (TSF) timestamps sent out in the beacon/probe response frames. Two different method for calculating clock skews are described—one based on linear programming and the other based on least square fit.

In addition, a heuristic is described for differentiating original packets from those sent by the fake APs. TSF timestamp data is collected from several APs in two different residential settings. Using measurement data, it has been determined that clock skews remain consistent over time for the same AP but vary significantly across APs. Furthermore, the resolution of received timestamp of the frames is improved. With the enhanced timestamp resolution clock skews are determined very quickly, using 50-100 packets in most of the cases. In addition, the impact of various external factors including temperature variation, virtualization, and network time protocol (NTP) synchronization on clock skews is quantified. The use of clock skews is an efficient and robust method for detecting fake APs in wireless local area networks.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

FIG. 2 is a block diagram illustrating the structure of fixed fields in beacon/problem response frames, in accordance with one embodiment of the present invention.

FIG. 3 illustrates sample code for separating clock offset-set points based on originating AP, in accordance with one embodiment of the present invention.

FIG. 4 illustrates sample code for calculating threshold from test clock offset-set, in accordance with one embodiment of the present invention.

DETAILED DESCRIPTION OF THE PREFERRED EMBODIMENTS

Figure 1:
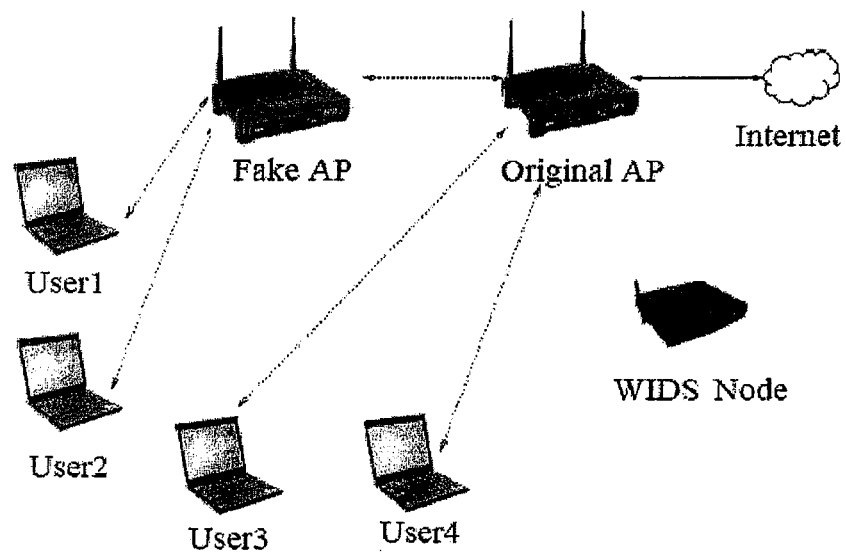
FIG. 1 is an illustration of a network of wireless devices for purposes of generating a clock skew as identification of one of the devices, in accordance with one embodiment of the present invention.

Reference will now be made in detail to the preferred embodiments of the present invention, a method and system for generating a clock skew as an identification tool for a wireless device. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Overview

Accordingly, embodiments of the present invention provide for a passive online scheme that can detect fake or unauthorized APs with high accuracy and minimum overhead. Estimations of clocks skews of APs are used for fingerprinting personal computers and servers. That is, an AP's clock skew acts as its fingerprint. This is because, while the clock skew of a device remains fairly consistent over time, clock skews across various devices vary significantly.

In one embodiment, clock skews are estimated in a local area setting, resulting in higher accuracy over wide area wired networks. In another embodiment, Time Synchronization Function (TSF) timestamps found in the IEEE 802.11 beacon/probe response messages sent by the AP are used to determine clock skew. The use of beacons has several advantages. First, beacons are sent all the time and at a fast rate (typically 10 to 100 frames per second) independent of any application. Second, the granularity of 802.11 TSF timer is one microsecond which is much higher than that of TCP timestamp clocks. Third, as the beacon timestamp is the actual time when an AP sends a frame (i.e., the time after the channel is sensed to be free) rather than the time when it is scheduled to send the frame, any significant unpredictable delays incurred by the network need not be considered, as opposed to when using TCP timestamps.

Therefore embodiments of the present invention are capable of estimating more accurate clock skews and at a higher rate, when compared to a TCP/ICMP timestamp approach. In addition, even faster times are achieved for estimating the clock skew by using high precision timers, at the fingerprinting node, that have resolutions in the order of microseconds to measure the arrival time of beacon frames.

Two different methods for estimating the clock skew of an AP are described. The first method is based on the linear programming approach. This method finds a line that upper-bounds all the time offsets calculated from the timestamps in the AP beacons and the time of arrival of those beacons at fingerprinting node. The slope of this line provides a clock skew estimate.

The second method is based on finding a line that is the least square distance from all the time offsets. The slope of the line represents an estimate of clock skew. As is discussed below, both of these methods perform their tasks fairly well.

A special case exists when the frames transmitted by the fake AP are interspersed with the frames transmitted from the authorized AP that is being faked. To achieve separation of frames with the same identifiers but from different APs, a novel method is described for differentiating frames sent by the fake AP and the authorized one that is being faked. The method exploits differences both in the beacon timestamp values of different APs as well as the different rates of incrementation of those values. For instance, in order to verify whether or not an AP is genuine, a WIDS node can compute the clock skew of the AP and compare it with the pre-computed clock skew of the AP with the same identity (e.g., MAC address).

The present invention uses an AP's clock skew as its fingerprint, since an AP's clock skew remains constant over time, but the clock skew varies between different APs. Embodiments of the present invention are capable of determining clock skews using 50-100 beacon packets. In addition, the calculation of clock skews takes into account through quantification the impact of temperature variation, virtualization, and NTP synchronization. The present invention provides for the use of clock skews as an efficient and robust method for detecting fake or unauthorized APs in WLANs.

Threat Model

An adversary can set up an unauthorized AP, also referred to as fake AP, to masquerade as an authorized one. Once the AP is able to access the network, it can gather passwords and data for harmful purposes. In addition, unauthorized APs can also be set up by some naïve user for convenience and higher productivity. However, if the AP security is not carefully managed, this seemingly innocuous practice opens up the network to unauthorized wireless hosts, who can now become part of the network and launch different types of attacks. Described below are two scenarios in which a fake AP can operate.

In the first scenario, the fake AP and the authorized AP that is being faked are both active at the same time. For example, the fake AP may fake the identifiers (i.e., SSID, MAC Address, BSSID) of the original AP and operate in a separate channel or may use a different sized wireless preamble to avoid collision with the original one. As the current AP selection mechanisms use signal strength as the only selection criteria, a user will select the fake AP if the user measures the fake AP's signal strength to be higher than the signal strength of the original AP.

In the second scenario, only the fake AP is active and the authorized AP being faked is inactive. This can happen when the authorized AP has failed on its own or due to a Denial-of-Service attack from the adversary, or when the user moves to a location where only the fake AP is reachable. The adversary can facilitate this by tracking and following the user.

In a considered threat model, the case is considered where the fake AP is spoofing the MAC address to pose as an authorized one, because if the MAC addresses are different then the fake AP can be easily detected using MAC address based filtering. In the current threat model, the adversary is powerful enough to modify any of the MAC address, BSSID and SSID fields of any frame. The adversary can also capture, collect and analyze any amount of data without being detected even before actually trying to break into the network. If the packets are sent across the network in encrypted form, the adversary is also capable of gathering enough packets needed to launch password guessing attacks. The adversary can also decrypt the packets once it succeeds in guessing the password.

Embodiments of the present invention address the detection of fake and unauthorized APs in all the above cases. Since the corresponding fingerprint is based on a physical characteristics of the AP (i.e., the clock skew), embodiments of the present invention can detect MAC, BSSID and SSID spoofing, whether the authorized AP is active or not.

Ad Hoc Wireless Networks Threat Model

Embodiments of the present invention P are able to detect the presence of unauthorized nodes that are accessing an ad hoc wireless network. For purposes of illustration, the ad hoc network includes wireless devices located throughout a geographic region, either on a temporary or more permanent basis. These devices are capable of communicating with each other directly, and through other devices in the ad hoc network, without the use of one or more central access points. It is beneficial to allow only authorized devices to communicate through the ad hoc wireless network. As particular examples, a network of friends playing a video game, or a military team operating within enemy territory can communicate through a temporary ad hoc wireless network. To maintain integrity of the network, embodiments of the present invention are capable of identifying any unauthorized devices or nodes trying to access the ad hoc wireless network based on clock skew fingerprints of the unauthorized device as well as authorized devices, thereby effectively restricting access to the ad hoc wireless network only to those authorized devices that are associated with members of the team.

Determining Clock Skews

In an IEEE 802.11 infrastructure wireless local area network (WLAN), there are two methods that a client station (STA) may use to find an AP in the WLAN: active scanning and passive scanning. In active scanning, the STA sends a probe request frame to determine which APs are within range. The APs in the vicinity then reply back with probe response frames. In passive scanning, the STA learns about the APs in the WLAN by listening to the beacon frames broadcast by the APs.

Figure 2:
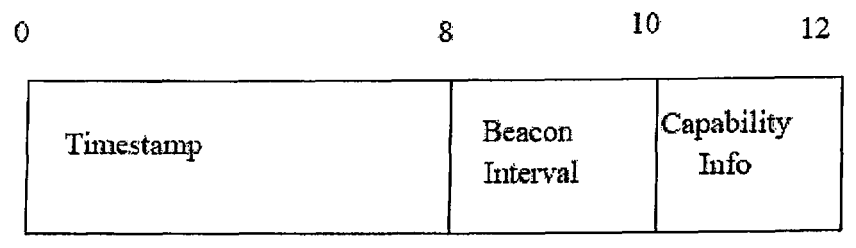

FIG. 2 is a diagram of a structure of fixed fields in a beacon/probe response frame. Beacon frames are sent periodically by each AP (10 to 100 times per second) for finding new STAs. Beacon frames are also used for time synchronization among all the STAs associated with an AP. Among other functions, this time synchronization is necessary for STA power management. Before an STA enters the power save mode, it needs to know the beacon interval for waking up at the appropriate time to receive the beacon. Beacons assist in power management at an STA by informing the STA whether the AP, generating the beacons, has buffered any frames that are destined to the STA.

The probe response and the beacon frames both have an 8 byte timestamp as shown in FIG. 2. The timestamp field contains the value of Timer Synchronization Function (TSF) timer of the AP when it sends the frame. The beacons are scheduled to be sent at periodic intervals by the APs. The timestamps in the beacon frames do not get affected by the random medium access delays of the wireless medium as drivers set the timestamp value just before actual transmission. The TSF timer is a 64 bit timer which is initialized at the time of starting the AP and incremented once every microsecond.

The present embodiment uses TSF timestamps in beacon/probe response frames to estimate the clock skew of an AP and uses the clock skew as the AP's fingerprint.

Embodiments of the present invention estimate accurate clock skew faster than the TCP timestamp based approach. First, the beacon packets are sent all the time and at a fast rate (e.g., 10 to 100 times in a second) compared to the TCP segments that are sent at rates that are controlled by the application generating them. Furthermore, the resolution of TSF clocks is in microseconds, which is much higher than the millisecond resolution of the TCP/ICMP timestamps. Another advantage of the present invention is that it remains unaffected by unpredictable network delays. The network delay can be calculated accurately in a WLAN environment. The rate at which a frame is transmitted and also the frame size are used to calculate the time taken by the frame to reach the receiver fairly precisely. Moreover, the timestamp in the beacon frame is the time when the AP actually transmits the packet (i.e. time after sensing the channel to be free), unlike the TCP segment timestamp which is the time when the TCP layer of the network stack sends the packet to the lower layers for transmission. This beacon timestamp helps in achieving higher accuracy in embodiments of the present invention.

Assume that a fingerprinter node (a WIDS node), has received n beacon frames from a particular AP. Let the timestamp in the ith beacon frame be $T_i$ and let $t_i$ be the time in microsecond when the fingerprinter receives the ith beacon frame. Let $S_i$ be the size of the ith beacon frame and let $R_i$ be the data rate at which ith beacon frame is sent.

Therefore, the time, according to the AP's clock, when the fingerprinter receives the packet is $T_i+S_i/R_i$. Let the estimated offset for the ith beacon frame be denoted $o_i$, and the time difference between the first received frame and the ith beacon frame according to the fingerprinter's clock be $x_i$, as shown in Eqns. 1 and 2.

$$x_i = t_i - t_1 \tag{1}$$

$$o_i = ((T_i + S_i/R_i) - (T_1 + S_1/R_1)) - (t_i - t_1) \tag{2}$$

In most of the cases, the beacon frames are sent at a fixed data rate and the size of the beacon frames remain fixed as well. As such, it can be assumed that $S_i/R_i = S_1/R_1$, which yields Eqn. 3.

$$o_i = (T_i - T_1) - (t_i - t_1) \tag{3}$$

If the clock skew of a particular device remains constant, the plot of $(x_i, o_i)$ is a n approximately linear pattern. As such, the clock skew can be estimated as the slope of this linear pattern. Let the set of points $(x_1, o_1), \ldots, (x_n, o_n)$ be the clock offset-set of the AP.

Linear Programming Method (LPM)

LPM finds a line $\delta x + \phi$, where $\delta$ is the slope of the line and $\phi$ is the y-axis intercept, that upper bounds the points in the clock offset-set of the AP and outputs the slope of the line, $\delta$, as the clock skew estimate. So, a clock skew estimation, $\delta$, is such that, $\forall i = 1 \ldots n$, in Eqn. 4.

$$\delta \cdot x_i + \phi \geq o_i \tag{4}$$

Also, the following function is minimized in Eqn. 5.

$$1/n \cdot \sum_{i=1}^{n}(\delta \cdot x_i + \phi - o_i) \quad (5)$$

This problem can be solved using linear programming methods for 2 variables.

The LPM method minimizes the effect of any unpredictable delays as it has higher tolerance towards outliers. The clock skew estimate remains stable even if there are significant number of outliers. However, in the present embodiment the number of outliers are less because no significant random delay is involved in the communication path and the TSF clocks have a higher precision than TCP timestamp clocks.

Least Square Fitting

Least square fitting (LSF) can also be used in one embodiment to estimate the clock skew of an AP from its clock offset-set. Given an offset-set $(x_1, o_1), \ldots, (x_n, o_n)$, LSF finds a line $\delta x + \phi$, where $\delta$ is the slope of the line and $\phi$ is the y-axis intercept, such that the condition in Eqn. 6 remains minimum.

$$\sum_{i=1}^{n}(o_i - (\delta \cdot x_i + \phi)^2) \quad (6)$$

One of the major differences of LSF from LPM is its lack of tolerance towards outliers. However, as mentioned earlier, for purposes of the present invention, the absence of any unpredictable delays make the number of outliers insignificant. Therefore, LSF can be used to estimate clock skews effectively. Moreover, LSF has an advantage over LPM in the scenario where an adversary tries to avoid detection by interspersing frames from a fake AP with the frames from the authorized one as described above. LSF's sensitivity to the presence of even a small number of outliers will help in determining a fake AP more effectively than LPM. For example LSF is effective in identifying a fake AP in the case where an adversary is able to mix a small number of beacons from a fake AP with the beacons of the authorized AP it is faking, and if the clock skew of the fake AP is close to the clock skew of the authorized AP. As such, it will be difficult for an adversary to masquerade frames from the fake AP as outlying data when LSF is used to estimate the clock skew.

Determining Clock Skew of a Device

Figure 5A:
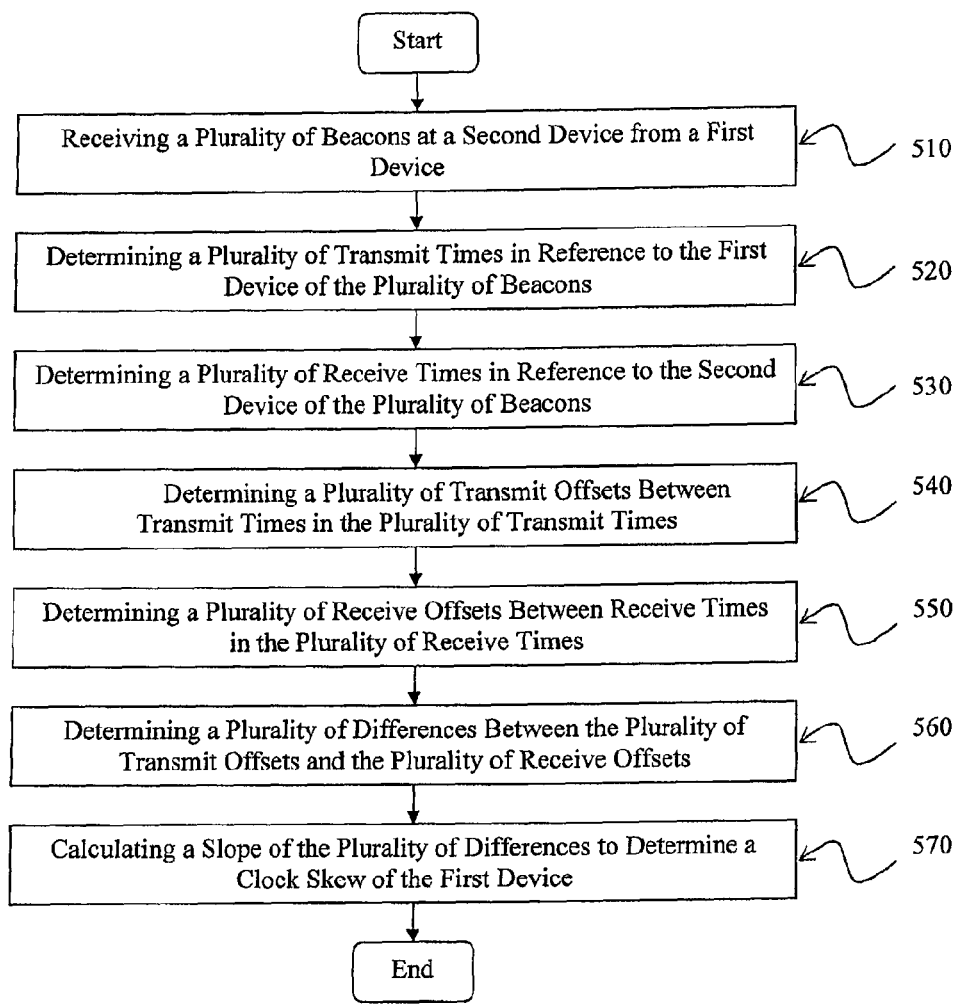
FIG. 5A is a flow chart of a method for generating a clock skew of a wireless device, in accordance with one embodiment of the present invention.
Figure 5B:
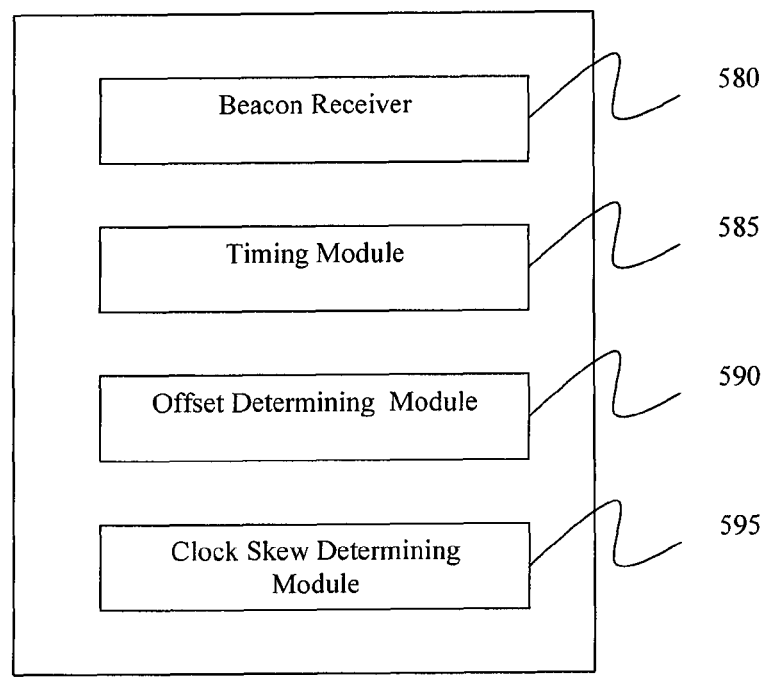
FIG. 5B is a block diagram of a system capable of generating a clock skew of a wireless device, in accordance with one embodiment of the present invention.

FIGS. 5A-B combined illustrate the generation of a clock skews for identifying APs. In particular, FIG. 5A is a flow chart 500A illustrating a method for generating clock skews that can be used for identifying APs, in accordance with one embodiment of the present invention. FIG. 5B is a block diagram of a system 500B capable of generating a clock skew of a wireless device using a process as described in FIG. 5A, in accordance with one embodiment of the present invention.

At 510, a plurality of beacons is received from a second device from a first device. For instance, the first device is an AP. For instance, in system 500B, a beacon receiver 580 receives the plurality of beacons from a device that is broadcasting the beacons.

At 520, a plurality of transmit times are determined in reference to the first device of the plurality of beacons. That is, for each beacon, a transmit time, as determined by the first device is determined. This is typically contained in the frame of the beacon packet. For instance, the timing module 585 in system 500B is capable of extracting the beacon transmit times by parsing the headers of the beacon packet.

At 530, a plurality of receive times is determined in reference to the second device for the plurality of beacons. That is, receive times, as determined by the second device are determined. For instance, the timing module 585 in system 500B is capable of determining the receive time for each beacon.

In one embodiment, the receive time is calculated from a call to the clock operated by the second device. For instance, a call is made outside of an operating system of the device, such as to a separate clock maintained by the second device. The call is to increase resolution of the receive time, as well as to reduce the random effects of time spent processing the beacon through the operating system. For instance, timing module 585 is configured to make the call to the clock, or any other timing mechanism, to determine the receive time, as referenced by the second device.

At 540, a plurality of transmit offsets is determined between transmit times in the plurality of transmit times. For instance, for each beacon, a transmit offset is determined between that beacon and the first beacon in the data set. The offset determining module 590 of system 500B is configured to determine the transmit offsets.

At 550, a plurality of receive offsets is determined between receive times in the plurality of receive times. For instance, for each beacon received, a receive offset is determined between that beacon received and the first beacon received in the data set. The offset determining module 590 of system 500B is configured to determine the receive offsets.

At 560, a plurality of differences between the plurality of transmit offsets and the plurality of receive offsets is determined. This plurality of differences is used to calculate clock skew of the first device. For instance, the clock skew determining module 595 of system 500B is configured to determine the plurality of differences for purposes of determining the clock skew.

At 570, a slope of the plurality of differences is calculated to determine a clock skew of the first device. More particularly, the slope can be determined from a sample of two or more beacons. The slope is calculated using a best fit method, such as the LSF or LPM based methods, described previously. The clock skew determining module 595 is configured to determine the clock skew by calculating the slope of the plurality of differences between the plurality of transmit offsets and the plurality of receive offsets.

The process in FIG. 5A is further described below to determine points used for calculating a slope. A first beacon signal is received at the second device, wherein the first beacon signal is transmitted from a first device (e.g., AP). A first transmit time of the first beacon signal is determined, as recorded by the first device. Also, a first receive time of the first beacon signal is determined, as recorded by the second device.

In addition, at the second device, a second beacon signal is received that is transmitted from the first device. A second transmit time of the second beacon signal is determined, as recorded by the first device. Also, a second receive time of the second beacon signal is determined, as recorded by the second device.

A first transmit offset of the first device is determined based on the first transmit time and the second transmit time. Also, a first receive offset of the second device is determined based on the first receive time and the second receive time.

A first difference is determined between the first transmit offset and the first receive offset.

In addition, a third beacon signal is received at the second device, wherein the third beacon signal is transmitted from the first device. A third transmit time of the third beacon signal is determined in reference to the first device. A third receive time of the third beacon signal is determined in reference to the second device. A second transmit offset of the first device is determined based on the first transmit time and the third transmit time. A second receive offset of the second device is determined based on the first receive time and the third receive time. A second difference is determined between the second transmit offset and the second receive offset. A clock skew is determined based on a slope between the first difference and the second difference.

Differentiating Frames of Fake APs

When an attacker tries to create one or more fake APs to masquerade as an authorized one, two scenarios can arise. First, the authorized AP and the fake APs are operating at the same time. In this case the clock offset-set that is calculated from the beacon frames will contain timestamps from the fake APs as well as the authorized one. As the fake APs use MAC address spoofing, its frames cannot be distinguished from those of the authorized AP. Second, two or more fake APs are operating, without any operation by an authorized AP. In this case, the offset-set will contain the timestamps from the fake APs only.

In both the cases it is necessary to separate out the clock offset-sets of the fake AP(s) and the authorized AP (if present) to gain insight about the fake APs. For example, if the attacker is using multiple fake APs to fake one authorized AP, the fake APs can be detected by separating the clock offset-sets. Also, estimating the clock skew of individual fake APs helps in guessing the method and the hardware used by the adversary (e.g., whether the fake AP is a general purpose Linux box running HostAP or whether the adversary is using custom hardware).

The present embodiment is capable of fitting multiple lines to a data set, using a lightweight heuristic or method. The method considers the following characteristics regarding clock offset-sets. The thickness of the lines in the clock offset-set plot (i.e., the variance of the points in the set) remains mostly constant across the APs. Also, the amount of noise in the data is negligible.

The method of one embodiment separates out beacons with the same identifier, but sent by different APs. This method relies on the fact that, at any given time, different AP's TSF timestamp counters tend to have different values. As such, different clock skews and different starting time causes the APs to have different TSF timestamps. TSF timestamp counter value is sent as the timestamp in the beacon frames. So if a clock offset-set is calculated from the beacons received from different APs, then the clock offset-set will contain certain jumps (i.e., sudden big changes in the value) at the boundary where one packet is from one AP and the successive packet is from another AP. The present embodiment of the method identifies these jumps and differentiates the data based on it. For instance, plotting the clock offset-set computed from packets coming from different APs provides a graph that contains multiple lines with different slopes.

Taking advantage of the above, packets can be differentiated from different APs. Let $\Delta_{ij}$ be the relative skew between two samples in the clock offset-set, $(x_i, y_i)$ and $(x_j, y_j)$. The relative skew, $\Delta_{ij}$, is defined in Eqn. 7, where |x| is the absolute value of x.

$$\Delta_{ij} = |y_i - y_j|/|x_i - x_j| \qquad (7)$$

The relative skew, $\Delta_{ij}$, represents the clock skew estimate between any two points i and j in the clock offset-set plot. If the clock offset-set contains data from only one AP then the relative skew between any two successive points in the clock offset-set remains consistent. However, if the clock offset-set contains beacons from multiple APs then the relative skew values tend to have different set of consistent values where each set stands for one AP.

A tunable threshold parameter is introduced to differentiate between jump and consistent increment. Thus, two consecutive points $(x_i, y_i)$ and $(x_j, y_j)$ in the clock offset-set are considered to be a jump if and only if $\Delta_{ij}$>threshold. As such, the clock offset-set data can be segregated into separate groups based on the jumps taken.

A table can be maintained that accumulates and separates data, in one embodiment. Each entry in the table consists of three fields, an array of points, a current point, and a count value. When a new point is read from the data set, the present embodiment checks the relative skew of that point from the current point of each of the table entries. For any entry, if the calculated relative skew is less than a threshold value, then the new point is added to the table entry's data set and the count of that entry is incremented by one. On the other hand, if the relative skew is greater than the threshold value, then a new entry is created with its current point set to the new point and the its count set to 1. The new point is also added to the dataset of the new entry.

FIG. 3 illustrates exemplary code for separating clock offset-set points based on originating AP, in accordance with one embodiment of the present invention. In FIG. 3, the threshold parameter is the only parameter that can be tuned. A limit can also be imposed on the count field to filter out small number of outliers that are not part of any data set. However, it is not expected that the WLAN samples contain outliers that are not part of any sample, and hence it is not necessary to set any limit on or tune the count field. The value of the threshold parameter can be estimated empirically from the clock offset-set of a single AP.

FIG. 4 illustrates exemplary code for calculating the threshold parameter from a test clock offset-set, in accordance with one embodiment of the present invention. That is, FIG. 4 can be used to find the threshold value from the test data.

The threshold parameter is estimated from different test data sets. The threshold parameter that is estimated can be determined from a very small amount of data (i.e., 50-100 packets depending on the received timestamp resolution) is enough to separate a wide variety of datasets. Once the datasets are separated using FIGS. 3 and 4, either LPM or LSF based methods can be used to estimate the exact clock skew of different fake APs.

Figure 6:
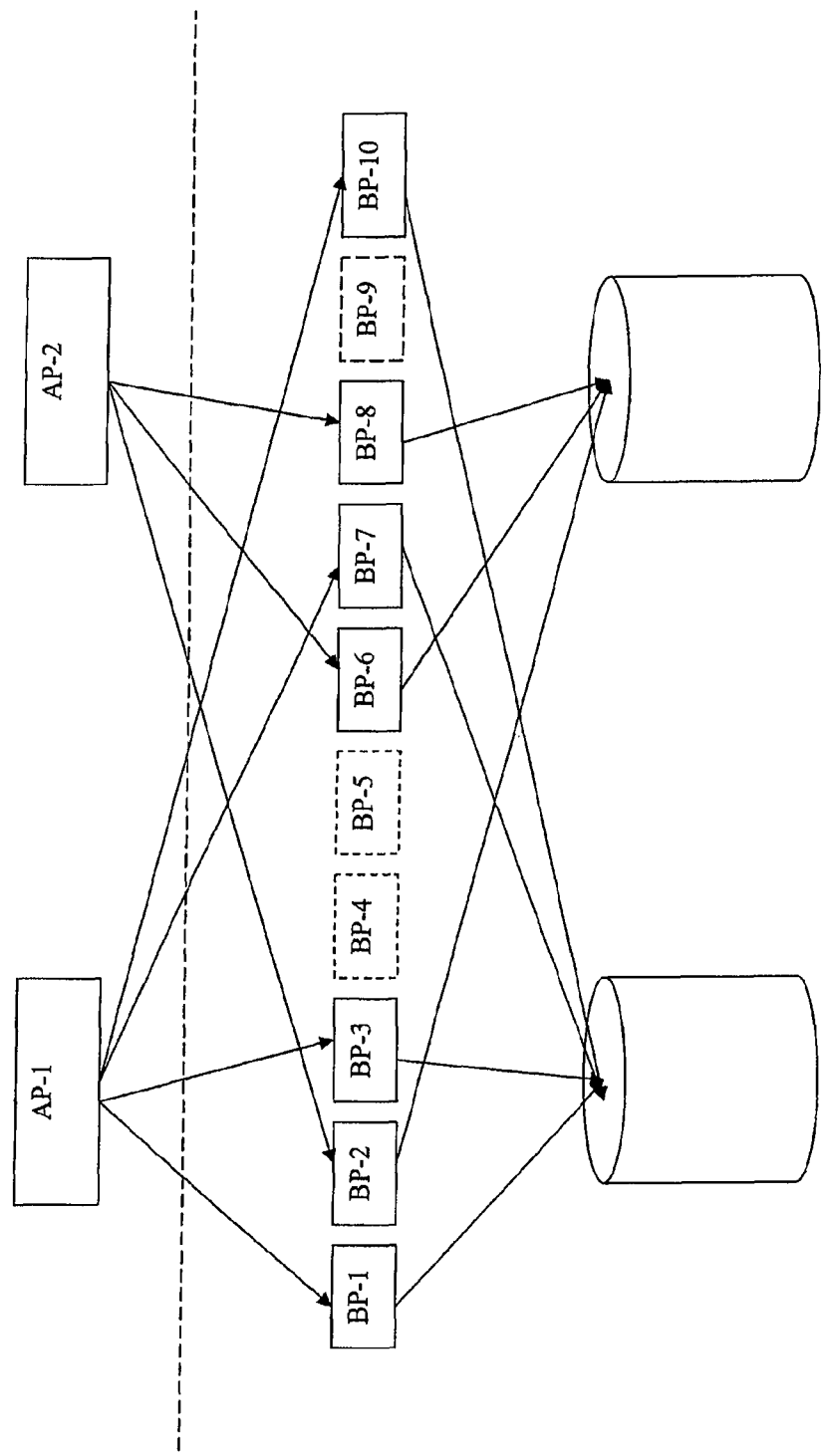
FIG. 6 is an illustration of multiple access points in an environment, in accordance with one embodiment of the present invention.

FIG. 6 is an illustration of multiple access points in an environment, in accordance with one embodiment of the present invention. As shown in FIG. 6, an environment can include multiple APs, for instance, AP-1 and AP-2. For purposes of illustration, AP-2 may be an adversary, while AP-1 is an authorized AP.

In FIG. 6, beacon packets are being sent by AP-1 and AP-2. For instance, AP-1 sends four beacon packets: BP-1, BP-3, BP-7, and BP-10. Also, AP-2 sends three beacon packets: BP-2, BP-6, and BP-8. The beacon packets are received by a receiving device, as shown in FIG. 6, where the beacon packet are received below the line A-A. In addition, the receiving device receives additional packets not sent from AP-1 or AP-2: BP-4, BP-5 and BP-9.

As will be described below in relation to FIG. 7, the present invention is able to determine a relative clock skew that is associated with each received beacon packet in order to differentiate beacon packets. That is, the present invention is able to place a received beacon packet in the proper bin that is associated with an AP. As shown in FIG. 6, the receiving device has two bins, one that is associated with AP-1 and one that is associated with AP-2. Each bin is associated with an AP through a clock skew of the device. That is, AP-1 is associated with a historical clock skew, which identifies and defines AP-1 to the receiving device. Also, AP-2 is associated with a clock skew, which identifies and defines AP-2. As such, based on relative clock skews of received beacons, the receiving device is able to associate BP-1, BP-3, BP-7, and BP-10 with AP-1 and to associate BP-2, BP-6 and BP-8 with AP-2.

Figure 7:
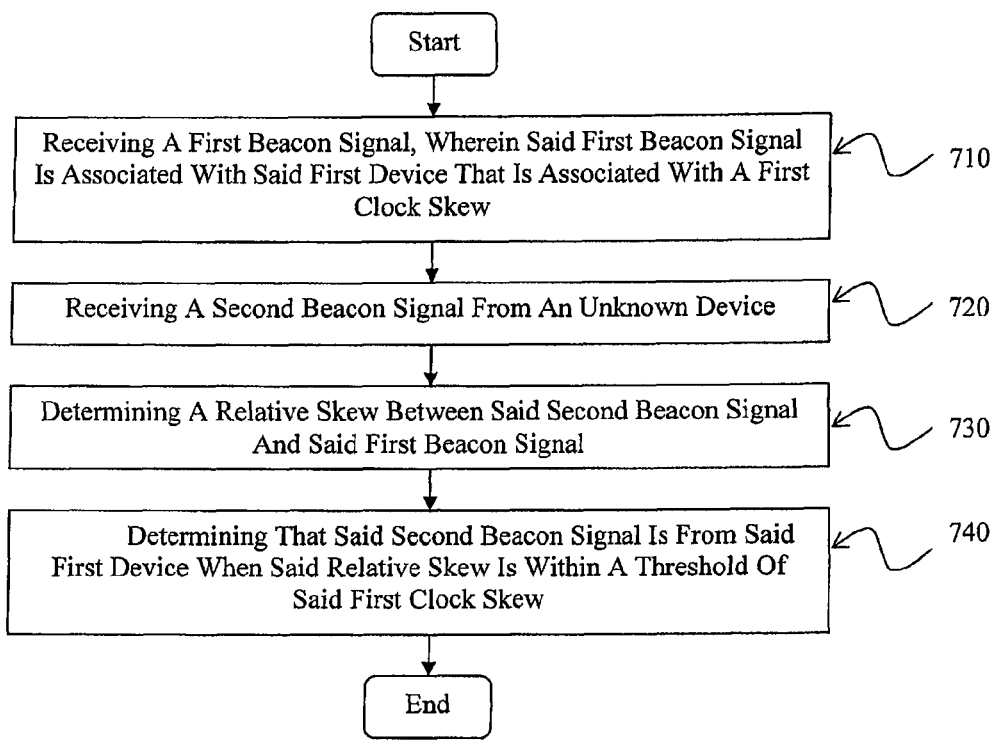
FIG. 7 is a flow chart illustrating a method for determining when a packet is associated with a corresponding access point, in accordance with one embodiment of the present invention.

FIG. 7 is a flow chart illustrating a method for determining when a packet is associated with a corresponding access point, in accordance with one embodiment of the present invention. In general, for every received beacon signal, a relative clock skew is calculated. For instance, a first beacon signal is received from an unknown device in an environment including a first device and a second device. The first device is associated with a first clock skew, and the second device is associated with a second clock skew, as discussed above.

Then, a relative clock skew is determined for the beacon signal. The relative clock skew defines the clock skew between two received beacon signals, or the slope between the two points associated with the two received beacon signals. The points are plotted as described previously.

For instance, a first relative skew can be determined between the first beacon signal and the last known beacon signal received from the first device. In addition, a second relative skew can be determined between the first beacon signal and the last known beacon signal received from the second device.

Thereafter, the first relative skew is compared to the first clock skew. If the first relative skew is within a threshold of the first clock skew, then the first beacon signal is assigned to the first device, in that the first beacon signal is determined to be sent from the first device.

Correspondingly, if the second relative skew is within a threshold of the second clock skew, then the first beacon signal is associated with the second device, in that the first beacon signal is determined to be sent from the second device.

Of course, if none of the relative skews are within a threshold of either the first clock skew or the second clock skew, then the first beacon signal is determined to be from another AP. In that case, another bin can be set up in FIG. 6, and a clock skew can be calculated from this new AP.

The process in FIG. 7 illustrates the calculation of the relative skew. At 710, a first beacon signal is received that is associated with the first device. The first device is associated with a first clock skew. The first beacon signal is known to be associated with the first device by following the process in FIG. 7, with a previously received beacon signal from the first device.

At 720, a second beacon signal is received from an unknown device. At 730, a relative skew between the second beacon signal and the first beacon signal is determined, following the process outlined in FIG. 5. At 740, it is determined that the second beacon signal is from the first device when the relative skew is within a threshold of the first clock skew.

Receive Clock Estimation

In order to accurately estimate the clock skew of an AP, it is necessary to precisely measure the time when a beacon frame reaches the wireless LAN card of the fingerprinter.

Prism monitoring headers can be used to determine receive time. Prism headers are present in various drivers. These drivers allow additional Prism monitoring headers to be added to frames arriving at the wireless card to record any extra information about the frames (e.g., received signal strength, signal to noise ratio, etc.). The Prism header also has a 4 byte timestamp field. The drivers use it to report the time when the packet is received by the wireless cards. This field may not have enough resolution to allow quick and accurate estimation of clock skew for an AP.

The present invention requires the use of a microsecond precision timestamp. However, a microsecond precision timestamp will quickly overflow a 4 byte field that the Prism header allows and has room for. As such, the present embodiment reformats the Prism header to another header with an 8 byte timestamp field (e.g., Radiotap header that has an 8 byte timestamp field.

In a Linux operating system, another timer function is supported, in its kernel. As such, the driver is modified to call "dogettimeofday," which supports microsecond resolution. The call is made each time a beacon frame is received. The timestamp is stored in the 8 byte timestamp field of the Radiotap header.

A method and system for generating a fingerprint from a clock skew of a device is thus described. While the invention has been illustrated and described by means of specific embodiments, it is to be understood that numerous changes and modifications may be made therein without departing from the sprit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method, implemented at a client computing device that includes one or more processors and one or more wireless communications devices, for determining clock skew for identifying valid wireless access points, the method comprising:

receiving, at the client computing device, a plurality of beacon frames from a wireless access point over the one or more wireless communications devices, the wireless access point including a first clock having a baseline clock skew and being configured to transmit the plurality of beacon frames and to record a transmit time within each transmitted frame, such that each of the plurality of beacon frames includes a corresponding timestamp generated at the wireless access point in connection with the wireless access point transmitting said frame;

determining, at the client computing device and based on each corresponding timestamp, a corresponding transmit time by the wireless access point for each of the plurality of beacon frames according to the first clock at the wireless access point;

determining, at the client computing device, a corresponding receive time by the client computing device for each of the plurality of beacon frames according to a second clock at the client computing device;

calculating, at the client computing device, a plurality of transmit offsets based on each corresponding transmit time by the wireless access point for each of the plurality of beacon frames, including for each of one or more beacon frames determining an offset between a transmit time of the beacon frame by the wireless access point and a transmit time of a prior beacon frame b the wireless access point;

calculating, at the client computing device, a plurality of receive offsets based on each corresponding receive time by the client computing device for each of the plurality of beacon frames, including for each of one or more beacon frames determining an offset between a receive time of the beacon frame by the client computing device and a receive time of a prior beacon frame by the client computing device;

determining, at the client computing device, a plurality of differences between the plurality of transmit offsets and the plurality of receive offsets;

calculating, at the client computing device, a slope of the plurality of differences;

calculating, at the client computing device, a clock skew of the first clock at the wireless access point based on the slope of the plurality of differences; and determining, at the client computing device, whether the wireless access point is an authorized wireless access point or an unauthorized wireless access point based on comparing the calculated clock skew with one or more known baseline clock skews of one or more authorized wireless access points.

2. The method of claim 1, wherein the plurality of beacon frames comprise a plurality of probe response frames that are generated by the wireless access point in response to at least one probe request sent to the wireless access point by the client computing device.

3. The method of claim 1, wherein the wireless access point comprises an ad hoc access point that is also a client computing device, and wherein the client computing device is also an ac hoc access point.

4. The method of claim 1, wherein the wireless access point comprises a central access point.

5. The method of claim 1, wherein determining whether the wireless access point is an authorized wireless access point or an unauthorized wireless access point based on comparing the calculated clock skew with one or more known baseline clock skews of one or more authorized wireless access points comprises:

determining that the wireless access point is an authorized wireless access point when the calculated clock skew is within a threshold of the one or more known clock skews of the one or more authorized wireless access points; and determining that the wireless access point is an unauthorized wireless access point when the calculated clock skew is outside of a threshold of the one or more known clock skews of the one or more authorized wireless access points.

6. The method of claim 1, wherein calculating a slope of the plurality of differences comprises using a least squares fit to calculate said slope.

7. The method of claim 1, wherein calculating a slope of the plurality of differences comprises using a linear programming method to calculate said slope.

8. The method of claim 1, wherein the wireless access point comprises a first wireless access point and the plurality of beacon frames comprise a first plurality of beacon frames, the method further comprising:

receiving, at the client computing device, a second plurality of beacon frames from a second wireless access point over the one or more wireless communications devices, each of the second plurality of beacon frames including a second corresponding timestamp generated at the second wireless access point in connection with the second wireless access point generating said frame;

determining, at the client computing device, a clock skew of a third clock at the second wireless access point based on the second plurality of beacon frames;

determining, at the client computing device, a relative skew between the clock skew of the first clock at the first wireless access point and the clock skew of the second clock at the second wireless access point;

determining, at the client computing device, that the second plurality of beacon frames is not from the first wireless access point when the relative skew is not within a threshold of the clock skew of the first clock; and identifying, at the client computing device and based on determining that the second plurality of beacon frames is not from the first wireless access point, the clock skew of the second clock as originating from an unauthorized wireless access point.

9. The method of claim 1, wherein the second clock at the client computing device comprises a physical clock, and wherein determining a corresponding receive time for each of the plurality of beacon frames according to the second clock at the client computing device comprises the client computing device making a plurality of calls for timestamps from the physical clock.

10. The method of claim 9, wherein the client computing device making a plurality of calls for timestamps from the physical clock comprises the client computing device making the plurality of calls outside of an operating system kernel.

11. The method of claim 9, further comprising the client computing device changing a packet type of a received frame to accommodate for greater granularity of a corresponding timestamp.

12. The method of claim 11, wherein the corresponding timestamp has a microsecond granularity, and wherein a receive time is placed in an 8 byte field.

13. A client computing device, comprising:

one or more processors;

one or more wireless communications devices; and one or more computer readable media having stored thereon computer-executable instructions that, when executed by the one or more processors, cause the client computing device to determine clock skew for fingerprinting a wireless access point, including the following:

receive a plurality of beacon frames from the wireless access point over the one or more wireless communications devices, the wireless access point including a first clock having a baseline clock skew and being configured to transmit the plurality of beacon frames and to record a transmit time within each transmitted frame, such that each of the plurality of beacon frames includes a corresponding timestamp generated at the wireless access point in connection with the wireless access point transmitting said frame;

determine, based on each corresponding timestamp, a corresponding transmit time by the wireless access point for each of the plurality of beacon frames according to the first clock at the wireless access point;

determine a corresponding receive time by the client computing device for each of the plurality of beacon frames according to a second clock at the client computing device;

calculate a plurality of transmit offsets based on each corresponding transmit time by the wireless access point for each of the plurality of beacon frames, including for each of one or more beacon frames determining an offset between a transmit time of the beacon frame by the wireless access point and a transmit time of a prior beacon frame by the wireless access point;

calculate a plurality of receive offsets based on each corresponding receive time by the client computing device for each of the plurality of beacon frames, including for each of one or more beacon frames determining an offset between a receive time of the beacon frame by the client computing device and a receive time of a prior beacon frame by the client computing device;

determine a plurality of differences between the plurality of transmit offsets and the plurality of receive offsets;

calculate a slope of the plurality of differences;

calculate a clock skew of the first clock at the wireless access point based on the slope of the plurality of differences; and determine whether the wireless access point is an authorized wireless access point or an unauthorized wireless access point based on comparing the calculated clock skew with one or more known baseline clock skews of one or more authorized wireless access points.

14. The client computing device of claim 13, wherein determining whether the wireless access point is an authorized wireless access point or an unauthorized wireless access point based on comparing the calculated clock skew with one or more known baseline clock skews of one or more authorized wireless access points comprises:

determining that the wireless access point is an authorized wireless access point when the calculated clock skew is within a threshold of the one or more known clock skews of the one or more authorized wireless access points; and determining that the wireless access point is an unauthorized wireless access point when the calculated clock skew is outside of a threshold of the one or more known clock skews of the one or more authorized wireless access points.

15. The client computing device of claim 13, wherein calculating a slope of the plurality of differences comprises using a least squares fit to calculate said slope.

16. The client computing device of claim 13, wherein calculating a slope of the plurality of differences comprises using a linear programming method to calculate said slope.

17. The client computing device of claim 13, wherein the wireless access point comprises a first wireless access point and the plurality of beacon frames comprise a first plurality of beacon frames, the method further comprising:

receiving, at the client computing device, a second plurality of beacon frames from a second wireless access point over the one or more wireless communications devices, each of the second plurality of beacon frames including a second corresponding timestamp generated at the second wireless access point in connection with the second wireless access point generating said frame;

determining, at the client computing device, a clock skew of a third clock at the second wireless access point based on the second plurality of beacon frames;

determining, at the client computing device, a relative skew between the clock skew of the first clock at the first wireless access point and the clock skew of the second clock at the second wireless access point;

determining, at the client computing device, that the second plurality of beacon frames is not from the first wireless access point when the relative skew is not within a threshold of the clock skew of the first clock; and identifying, at the client computing device and based on determining that the second plurality of beacon frames is not from the first wireless access point, the clock skew of the second clock as originating from an unauthorized wireless access point.

18. The client computing device of claim 13, further comprising the client computing device changing a packet type of a received frame to accommodate for greater granularity of a corresponding timestamp.

19. One or more hardware storage devices having stored thereon computer-executable instructions that, when executed by one or more processors of a client computing device, cause the client computing device to perform a method for determining clock skew for fingerprinting a wireless access point, the method comprising:

receiving a plurality of beacon frames from the wireless access point over the one or more wireless communications devices, the wireless access point including a first clock having a baseline clock skew and being configured to transmit the plurality of beacon frames and to record a transmit time within each transmitted frame, such that each of the plurality of beacon frames includes a corresponding timestamp generated at the wireless access point in connection with the wireless access point transmitting said frame;

determining, based on each corresponding timestamp, a corresponding transmit time by the wireless access point for each of the plurality of beacon frames according to the first clock at the wireless access point;

determining a corresponding receive time by the client computing device for each of the plurality of beacon frames according to a second clock at the client computing device;

calculating a plurality of transmit offsets based on each corresponding transmit time by the wireless access point for each of the plurality of beacon frames, including for each of one or more beacon frames determining an offset between a transmit time of the beacon frame by the wireless access point and a transmit time of a prior beacon frame by the wireless access point;

calculating a plurality of receive offsets based on each corresponding receive time by the client computing device for each of the plurality of beacon frames, including for each of one or more beacon frames determining an offset between a receive time of the beacon frame by the client computing device and a receive time of a prior beacon frame by the client computing device;

determining a plurality of differences between the plurality of transmit offsets and the plurality of receive offsets;

calculating a slope of the plurality of differences;

calculating a clock skew of the first clock at the wireless access point based on the slope of the plurality of differences; and determining whether the wireless access point is an authorized wireless access point or an unauthorized wireless access point based on comparing the calculated clock skew with one or more known baseline clock skews of one or more authorized wireless access points.

20. The method of claim 1, further comprising differentiating between beacon packets from different wireless access points based on a starting time of a corresponding clock of each different wireless access point, and calculating a clock skew for each corresponding clock of each different wireless access point.

* * * * *

UNITED STATES PATENT AND TRADEMARK OFFICE
CERTIFICATE OF CORRECTION

| | | |
|---|---|---|
| PATENT NO. | : 9,049,225 B2 | Page 1 of 1 |
| APPLICATION NO. | : 13/063687 | |
| DATED | : June 2, 2015 | |
| INVENTOR(S) | : Suman Jana and Sneha Kasera | |

It is certified that error appears in the above-identified patent and that said Letters Patent is hereby corrected as shown below:

Column 1, Line 7, Replace paragraph under heading NOTICE OF FEDERAL FUNDING --This invention was made with government support under W911NF-07-1-0318 awarded by U.S. Army Research Laboratory/Army Research Office. The government has certain rights in the invention.--

Signed and Sealed this
Twentieth Day of October, 2015

Michelle K. Lee
*Director of the United States Patent and Trademark Office*